April 15, 1941. S. J. ZAND ET AL 2,238,300
AIRPLANE AUTOMATIC PILOT WITH AUTOMATIC BANKING
Original Filed May 14, 1938 4 Sheets-Sheet 1

Stephen J. Zand
Theodore W. Kenyon
BY
Herbert H. Thompson
THEIR ATTORNEY

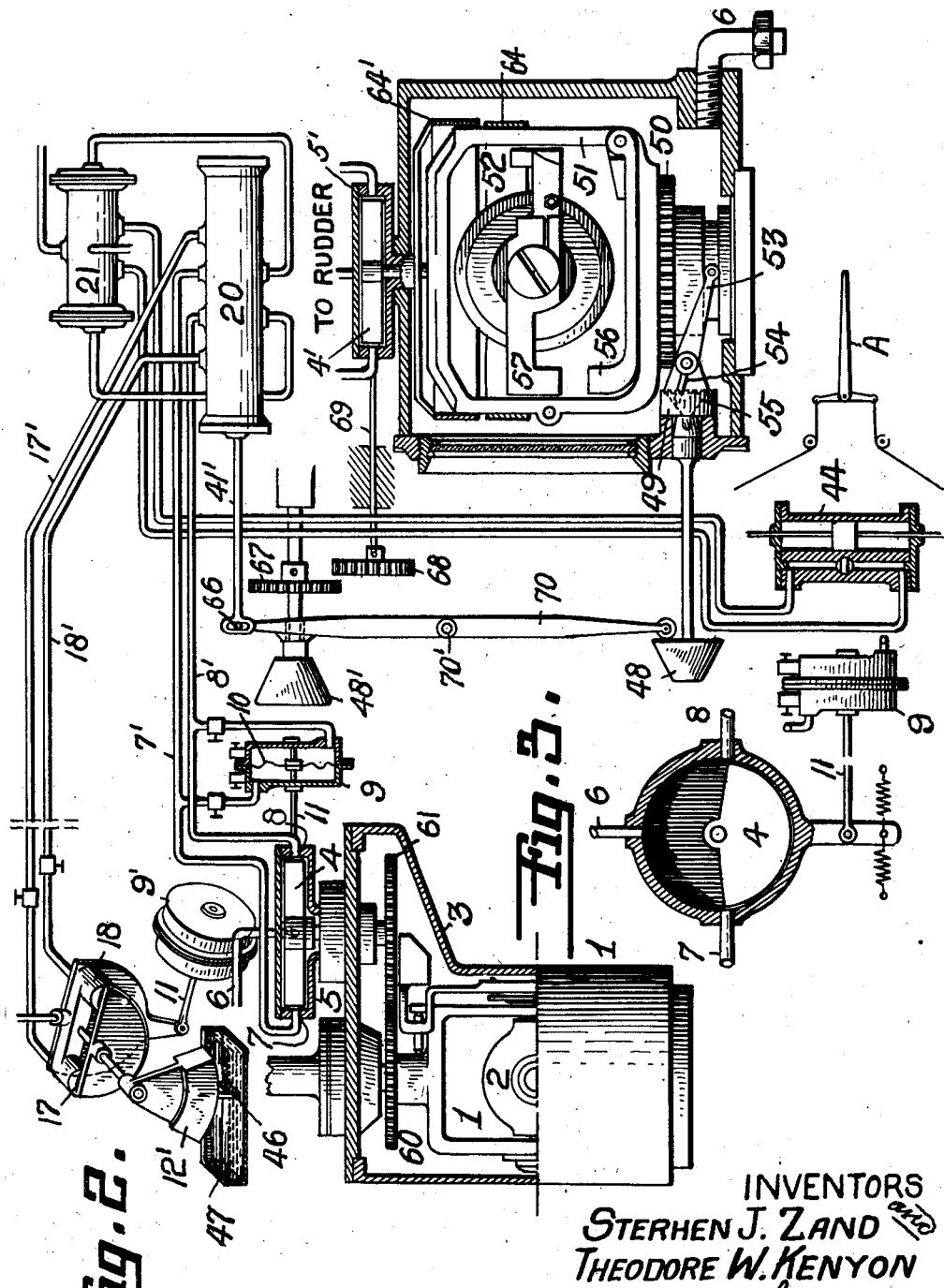

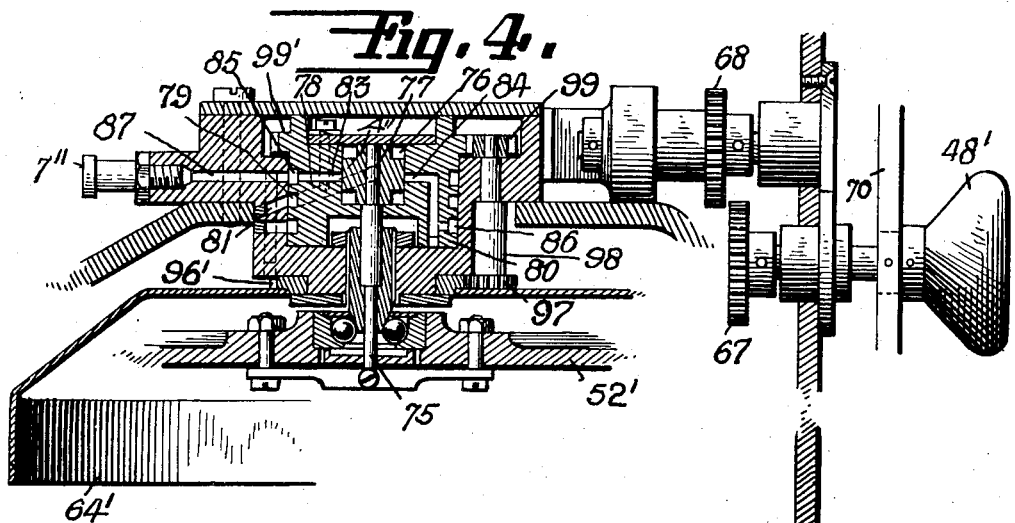
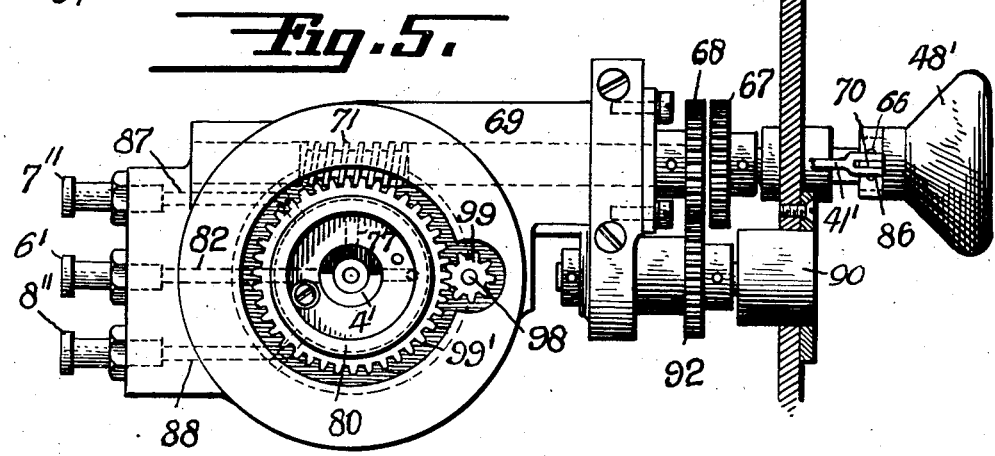
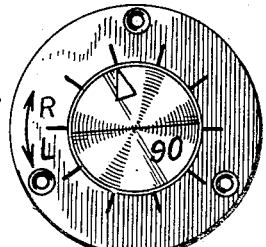
Stephen J. Zand
Theodore W. Kenyon
BY
Herbert H. Thompson
THEIR ATTORNEY

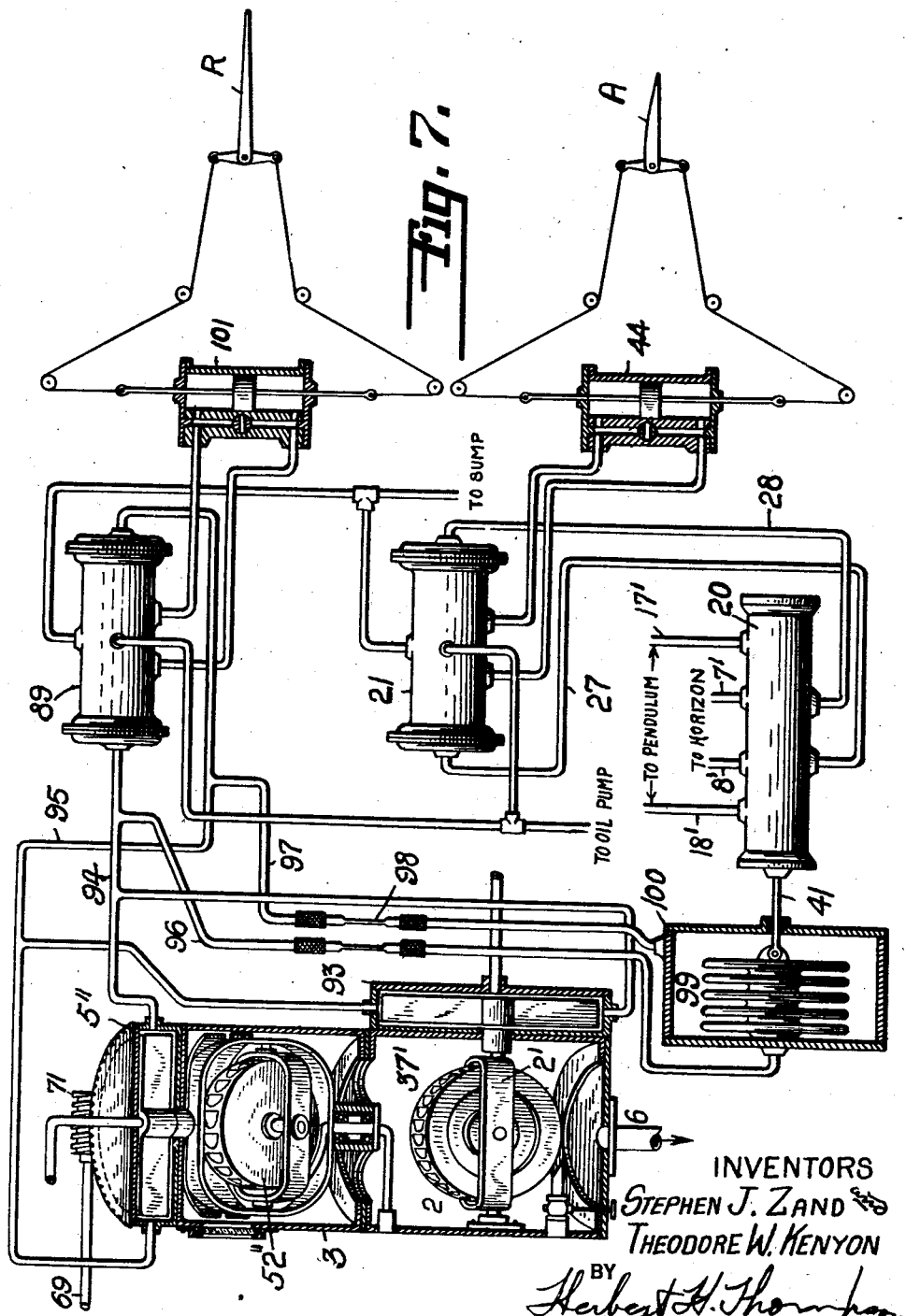

UNITED STATES PATENT OFFICE 2,238,300

AIRPLANE AUTOMATIC PILOT WITH AUTOMATIC BANKING

Stephen J. Zand, Forest Hills, and Theodore W. Kenyon, Huntington, N. Y., assignors to Sperry Gyroscope Company, Inc., Brooklyn, N. Y., a corporation of New York Application May 14, 1938, Serial No. 207,920
Renewed July 16, 1940

13 Claims. (Cl. 244—76)

This invention relates to automatic pilots for aircraft, and especially to the provision of a means therein for automatically banking the craft at the correct angle when turned through the automatic pilot. When a turn is set into a simple automatic pilot without bank control, the gyroscopic artificial horizon element of the pilot operates to keep the airplane level laterally and, therefore, to prevent the normal bank of the craft, causing an unpleasant skid maneuver unless the banking knobs on the pilot are also manipulated to the proper degree. This is due to the fact that the gyroscope is not affected materially by lateral acceleration forces.

A simple pendulum, on the other hand, furnishes an ideal base line for banking when turning, because a free pendulum indicates the correct banking angle. It has therefore been proposed in the prior art to use a pendulum alone or in combination differentially with a gyroscope for automatically controlling the ailerons. A pendulum, however, is not suitable for the continuous control of the ailerons, since in ordinary straight flying it is immediately displaced by any lateral acceleration force. Even when used with a gyroscope, it constitutes a disturbing factor in ordinary straight flight and seriously interferes with the resumption of straight flight after a turn.

According to our invention, we propose to employ both the gyroscopic artificial horizon or gyro vertical and a pendulum as a base line control of the ailerons, each operating independently but at separate times, i. e., to employ the gyroscope for normal straight flight and to transfer the control to the pendulum during turns. By this means, level flight is maintained during straight line flight and proper automatic banking is secured when turning, thus preventing skidding or side slipping.

For this purpose we employ a change-over valve for transferring the control from the gyroscope to the pendulum whenever a turn is started, and retransferring the control to the gyroscope as soon as the turn is completed. The latter step is quite as important as, if not more important than the former, since in prior attempts to combine pendulums and gyroscopes the pendulum operated differentially and tended to keep the airplane banked, and hence maintained a turn after the rudder had been moved back to the straight flight position, because a banked airplane will turn even though the rudder may be straight.

The transfer or change-over valve may be operated by any one of a number of instrumentalities which is brought into action when a turn is desired or started. One such means may be a conventional turn indicator type gyroscope which automatically displaces the change-over valve whenever an appreciable turn is detected. Or the change-over valve may be operated directly from one or both of the turn or course change knobs on the automatic pilot. Or the change-over valve may be operated by a differential pressure element operated by the differential pressure which builds up in proportion to the duration of the turn detected by the directional gyro and turn indicator combined.

Referring to the drawings, showing several forms our invention may assume,

Fig. 2 is a similar view showing an alternative method of operating the change-over valve from the turn causing knobs on the directional gyroscope.

Fig. 3 is a vertical sectional view of the pick-off valve on the horizon gyroscope.

Fig. 4 is a vertical section, on a larger scale, through the top of the preferred construction of directional gyro pick-off.

Fig. 5 is a plan view of the same.

Fig. 6 is a front elevation of the scale of the course change dial.

Fig. 7 is a diagrammatic view showing a third method of operating the change-over valve by a continued preponderance of air pressure in the signal line from the directional gyroscope and/or rate of turn gyro.

Figure 1:
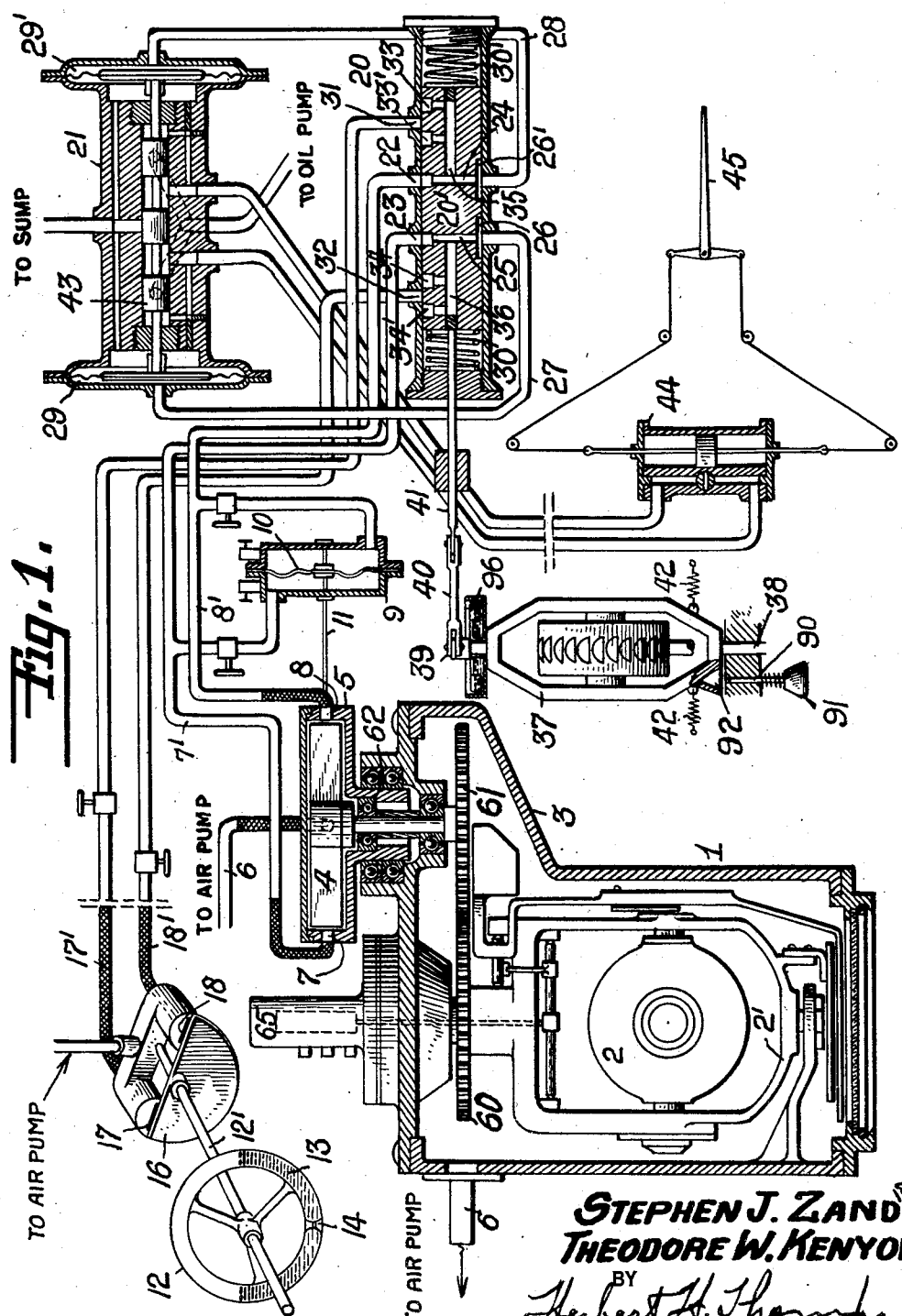
Fig. 1 is a diagrammatic view with the principal parts in section, showing the aileron controlling portion of an automatic pilot.

Referring first to Fig. 1, a gyro vertical or artificial horizon for controlling the longitudinal and lateral stability of the craft is shown at 1, this type being described more in detail in our prior application Serial No. 200,084, filed April 5, 1938, for Automatic pilot for dirigible craft. The horizon gyroscope 2 of this device is enclosed within an outer casing 3, the gyroscope being shown in plan in Fig. 1, and the aileron control is picked off therefrom by means of a semicircular valve member 4 turned from the gimbal ring 2' through gears 60 and 61. Said valve is enclosed in a valve casing 5, both being rotatably mounted on the exterior of the casing 3 through nesting bearings 62. Air is continuously exhausted from the casing 5 through flexible pipe 6 and the two intake ports 7 and 8 are normally closed or partially closed to an equal extent by the valve 4 (see Fig. 3). A follow-up device 9 may also be provided at the valve, as in our prior application, the same being shown as in the form of a differential pressure diaphragm or piston 10 connected to the flexible pipes 7' and 8' and having a link connection 11 so as to rotate the casing 5 in a direction to follow the valve member. The elevator or pitch controller is enclosed in cylinder 65 at the rear of the casing 3.

The pendulum controller is in this instance shown as in the form of a wheel 12 secured to shaft 12' and having a hollow rim which is partially filled by a liquid 13, such as mercury. A partition 14 with a constricted opening is provided at the bottom of the channel so as to make the device pendulous and also damp the same. Mounted on the shaft 12' of the pendulous element is a cut-off disc 16 designed to cooperate with air ports 17 in a member 18. Said member may be rotatable and provided with a follow-up device 9' (Fig. 2), similar to device 9, operating to rotate the member 18 to follow the disc 16 as the differential pressure varies in the pipes 17' and 18' leading therefrom.

The pipes 7', 8', 17' and 18' all lead to a change-over or transfer valve 20, the purpose of which is to transfer the control of the ailerons from the gyroscope to the pendulum upon turns as by transferring the relay valve 21 from pick-offs 4, 5 to pick-offs 16, 17 and back again from the pendulum to the gyroscope upon the straight track being resumed. The pipes 7' and 8' are shown connected to the central ports 22 and 23 with which transverse passage 24 and 25, through the cylinder valve proper 20', normally register. Said passages are connected with elongated channels 26 and 26' in the piston valve, which register with the outlet pipes 27 and 28 at all times, said pipes being connected to the differential air chambers 29 and 29' on the relay valve. The valve is normally centralized by springs 30 and 30', but when moved in either direction a short distance, the ports 22 and 23 will be cut off and the ports 31 and 32 (connected with pipes 17' and 18') will be connected to either one of a pair of short channels 33, 33', or 34, 34', dependent upon the direction of movement of the valve. One pair of channels is connected with an axial bore 35 connected with cross channel 24, the other pair is connected similarly to bore 36 and cross channel 25. It will be readily apparent, therefore, that when the valve is displaced from its normal position in either direction, the pick-off 4, 5 at the pendulum assumes control of the relay valve 21 instead of the pick-off 16, 17 at gyroscope.

The transfer valve is shown as automatically positioned, in Fig. 1, from a rate of turn type gyroscope 37. During straight flight, said gyroscope maintains the position shown in Fig. 1, but upon appreciable turn, the gyroscope will overcome the viscous brake 96 and springs 30, 30' and precess on its trunnion axis 38 to rock a crank arm 39 and thereby move, through link 40 and valve rod 41, the valve 20' to place the relay 21 under control of the pendulum. Brake 96 is for the purpose of preventing piston 20' of valve 20 from being continuously displaced back and forth by slight yaws of the craft as distinct from a definite turn. As soon as the turn ceases, however, the piston 20' will move back to its central position under the influence of springs 30, 30' and, if desired centralizing springs 42 on the gyroscope, and control from the horizon resumed. To hasten this action and prevent the caused bank of the craft from interfering with the resumption of straight flight we may provide a centralizing pin 90 for gyroscope 37, so that by pushing in on knob 91 pin 90 will engage conical cavity 92 in the rotor bearing ring of gyro 37 and centralize the same. Thus pendulum control is severed and gyro-control resumed which of course is without bank. The relay valve is shown as of the same type as disclosed in our prior application 200,084, in which a piston valve 43 controls the flow of pressure oil from the pump to the main servo motor 44 which operates the ailerons 45, only one of which is shown in the drawings, the relay valve also connecting the return flow of oil to the sump.

Instead of using a turn indicator type of gyroscope for operating the transfer valve, we may employ the standard course change means employed in the automatic pilot for this purpose. Such a modification is illustrated in Fig. 2, wherein the horizon gyroscope 1, transfer valve 20, relay valve 21 and servo motor 44 are again shown as before. The pick-off from the pendulum is also similar, the pendulum in this instance being shown as an ordinary pendulous mass 12', lightly damped by a blade 46 thereon dipping into a liquid containing trough 47.

Only the direction maintaining instrument, i. e. directional gyroscope 52 is shown of the normal rudder control, but it will be understood that the pick-off thereon controls the rudder through a relay valve and servomotor as shown in Fig. 7. The course change may be effected in this instrument either by caging the gyroscope and turning the same to the new course as shown by cards 64 and 64' or by displacing the pick-off device 51 with respect to the gyroscope. The former is shown as effected through a resetting knob 48, which knob is pushed in to cage the gyroscope and then rotated to turn the same to the desired new course, such caging and resetting mechanism being well known in the art and indicated generally as a crowned pinion 49 which engages the teeth 50 on the bottom of the vertical ring 51 of the directional gyroscope 52. The knob when pushed in to engage the gears also rocks the forked lever 53 upwardly by the engagement of a pin 54 in the rear end thereof with a conical recess 55 in the face of the gear 49, thus raising the locking arm 56 against the rotor bearing ring 57 on the gyroscope, as more fully described in the prior patent to Carlson, No. 2,061,894, dated November 24, 1936, for Directional gyroscopes.

The act of pushing in the knob 48 to reset the gyro and change the course is caused to effect movement of the change-over valve 20 as by means of a lever 70 pivoted at 70' and having a pin 66 at its upper end engaging an elongated slot in the T-shaped head on the piston rod 41' of the change-over valve 20 so as to transfer the control of the relay valve 21 from the gyroscope or artificial horizon 1 to the pendulum 12'.

The other method of changing course is represented as effected through a course changing knob 48' represented as normally inoperative but which, when pushed in, engages a gear 67 on the shaft thereof with a gear 68 on a shaft 69 which rotates, through a worm gear 71 (Fig. 5), a sleeve 80 forming the housing of the azimuth pick-off device 4', which may be quite similar to the pick-off device 4, 5 on the horizon gyroscope. However, since complete rotation in azimuth is desired, the detailed construction shown in Figs. 4, 5 and 6 is preferred. The knob 48', when pushed in, also rocks the lever 70 on which it is mounted, to move the valve stem 41' to effect the change-over from gyroscope to pendulum, and vice versa, when the course is being changed and the straight course resumed. In Figures 4 to 6 the cut-off semicircular valve is shown as at 4", the same being mounted on a central shaft 75 secured to the vertical ring 52' of the directional gyroscope. Air is continuously withdrawn from the valve chamber 76 through a port 77 which is connected through a passage 78 with a circular groove 79 in the rotatably mounted sleeve 80. Said groove, in turn, is connected to a port 81 which leads to the exhaust passage 82 connected with the exhaust pipe 6'. The two pick-off ports on opposite sides of the valve 4' are shown at 83 and 84, which pass through the sleeve into circular channels 85 and 86 therein which, in turn, are connected to the passages 87 and 88 leading to the pipes 7" and 8" which lead to the rudder relay valve 89 (Fig. 7). If desired, a change course dial 90 may be provided adjacent the knob 48' and rotated by gear 68 meshing with the gear 92 thereon. Course change card 64' is shown as secured to an annular gear 96 turned from pinion 97 on stub shaft 98, which in turn is driven from a pinion 99 thereon meshing with gear teeth 99' on the upper part of sleeve 80.

Still another method of effecting transfer from gyro to pendulum and vice versa is shown in Fig. 7, which is shown as applied to an automatic steering device employing a combination of directional gyroscope or other direction maintaining device and rate of turn gyroscope, such as shown in our prior application Serial No. 149,136 filed June 19, 1937. According to this system, the pick-offs 5" from the directional gyroscope 52" and 93 from the turn indicator gyroscope 37' are commingled and lead to the rudder relay valve 89 through common pipes 94 and 95. Into said pipes are tapped pipes 96 and 97, each of which has a long restricted passage 98 therein, one of said pipes being connected to the interior of a metallic bellows 99 and the other to the interior of the box 100 containing the metallic bellows. During ordinary operation, the pressure within the box and within the bellows will remain substantially the same, since minor temporary variations in pressure in the pipes 94 and 95 will not build up sufficient pressure through restriction 98 to move the bellows. If, however, a turn is made, the persistent predominance of pressure in one pipe will cause the bellows to expand or contract, and thus move the change-over valve 29 to which the bellows is connected through the piston rod 1. In this figure we have also shown the complete control for the rudder R from the rudder servomotor 101 and the rudder relay valve 89, as well as the complete control for the ailerons A from the aileron servomotor 44 and relay valve 21.

It is obvious that the system as shown in Fig. 7 will work equally well with both instruments, i. e. directional gyro and rate gyro operating, or with only one of them in operation.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. It is also obvious that the broad principles of this invention are applicable to other forms of base line instruments for controlling automatic pilots than herein shown. The gyro vertical or artificial horizon illustrated, viewed in its broad aspect is a form of long period device which is slowly responsive to gravity, and therefore one which will maintain a substantially horizontal reference plane regardless of the presence of intermittent lateral acceleration forces. On the other hand, the pendulums shown are, broadly speaking, examples of relatively short period gravitationally responsive devices, which naturally includes liquid levels and the like as well, and which are immediately affected by the presence of lateral acceleration forces, and the position of which at any one time shows the apparent vertical, i. e. the direction of the resultant of the gravitational and lateral accelerations, rather than the true vertical.

Having described our invention, what we claim and desire to secure by Letters Patent is:

1. In an automatic pilot for aircraft, a gyro vertical, a servomotor normally controlled from said gyro vertical for governing the ailerons, a pendulum for alternatively controlling said servomotor, and means responsive to turn of the craft for transferring the control of said servomotor from said gyro vertical to said pendulum.

2. An automatic pilot as claimed in claim 1, wherein said last named means transfers the control back to the gyro vertical upon the resumption of straight flight.

3. In an automatic banking arrangement for airplane gyro-pilots, the combination with the ailerons, rudder, the gyro vertical for normally positioning the former and the positional maintaining means for positioning the latter, of an auxiliary pendulum for alternatively positioning said ailerons, means for causing the craft to turn through said pilot, and means brought into action thereby for transferring the aileron control from said gyro vertical to said pendulum.

4. An automatic banking system for airplane automatic pilots as claimed in claim 3, wherein said last named means also retransfers the aileron control from said pendulum to said gyro vertical upon setting said first named means for straight flight.

5. In an automatic banking arrangement for airplane gyro-pilots, the combination with the ailerons, rudder, the gyro vertical for normally positioning the former and the positional maintaining means for positioning the latter, of an auxiliary pendulum for alternatively positioning said ailerons, differential air pressure pick-off means at said position maintaining means for controlling the rudder, and means responsive to continued preponderation of pressure in one direction for transferring the aileron control from said gyro vertical to said pendulum.

6. An automatic banking system for airplane automatic pilots as claimed in claim 5, wherein said last named means also retransfers the aileron control from said pendulum to said gyro vertical upon equalization of the pressure.

7. In an automatic pilot for aircraft, a gyro vertical, a servomotor normally controlled from said gyro vertical for governing the ailerons, a pendulum for alternatively controlling said servomotor, gyroscopic means for detecting an appreciable turn of the craft, and means brought into action thereby for transferring the control of said servomotor from said gyro vertical to said pendulum.

8. In an automatic pilot for aircraft, a gyro vertical, a servomotor normally controlled from said gyro vertical for governing the ailerons, a pendulum for alternatively controlling said servomotor, a rate of turn gyroscope for detecting an appreciable turn of the craft, and means brought into action thereby for transferring the control of said servomotor from said gyro vertical to said pendulum and vice versa.

9. In an automatic banking arrangement for airplane gyro-pilots having both a direction maintaining means and a rate of turn means as the azimuth control, differential air pressure pick-off devices at each, a relay valve controlled from both, a gyro vertical and a pendulum for alternatively controlling the banking of the craft, and means responsive to continued preponderance in effective pressure supplied to said valve for transferring the bank control from said gyro vertical to said pendulum.

10. In a differential air flow pick-off for the directional gyroscope of automatic pilots, a cut-off valve turnable with the gyroscope and having a rounded periphery cut away to form spaced peripheral knife edges, a ported sleeve having a cylindrical hollow interior surrounding said valve having opposite pick-off ports and an exhaust port, a ported chamber in which said sleeve is rotatably mounted, circumferential channels in one of said sleeve and chamber and connecting said pick-off exhaust ports with pipes leading to the pilot and vacuum pump, and means for turning said sleeve to change course.

11. In an automatic pilot for aircraft, a long period device slowly responsive to gravity for normally controlling the banking attitude of the craft, a relatively short period gravitationally responsive device for controlling the banking attitude when turning, and means for shifting the banking control from said first to said second device during turns.

12. An automatic pilot for aircraft comprising direction maintaining means for controlling the rudder, means controlling the ailerons for maintaining the craft level laterally, a course setting knob for causing a turn of the craft through any desired angle through the medium of said direction maintaining means, and means also brought into operation by movement of said knob whereby said ailerons are adjusted to give the proper banking angle to the craft during the resultant turn.

13. An automatic pilot for aircraft comprising a directional gyroscope, pick-off means thereat for controlling the rudder, a course change knob for adjusting the relative position of said gyroscope and pick-off means, whereby the course may be changed through any desired angle, a servomotor for controlling the ailerons, and means brought into operation by movement of said knob whereby said ailerons are adjusted to give the proper banking angle to the craft during the resultant turn.

STEPHEN J. ZAND.
THEODORE W. KENYON.